Fig. 2.

May 24, 1949.　　J. A. SPENCER ET AL　　2,471,126
CODE CONVERTER AND ERROR DETECTOR
Filed Oct. 24, 1946　　　　　　　　　　　　5 Sheets-Sheet 3

Fig.3.

INVENTORS
JAMES A. SPENCER
& LEWIS A. THOMAS
BY H. S. Grover
ATTORNEY

Patented May 24, 1949

2,471,126

UNITED STATES PATENT OFFICE 2,471,126

CODE CONVERTER AND ERROR DETECTOR

James A. Spencer, Teaneck, N. J., and Lewis A. Thomas, Brooklyn, N. Y., assignors to Radio Corporation of America, a corporation of Delaware Application October 24, 1946, Serial No. 705,314

6 Claims. (Cl. 178—3)

1

This invention relates to telegraph systems and more particularly to a telegraph system in which a perforated tape passing through a tape transmitter actuates a relay translator and distributor, effecting conversion from one standard code to another.

In telegraph systems, messages are frequently received over circuits employing one type of signalling code and retransmitted over circuits using a different code. A number of devices designed to perform automatically the function of translating from one code to another have been developed, types of which are exemplified in Spencer Patents No. 2,228,417, granted February 18, 1941, and 2,232,082, granted January 14, 1941.

Where the transferal from one code to another is used at terminal stations at which the incoming signals are received by radio, the signals are peculiarly subject to distortion because of fading and interference. These distortions may give rise to erroneous signals being perforated in the tape. It is desirable that some means be devised to cause a special code group to be perforated upon the reception of erroneous signals. Such a device is disclosed in Spencer Patent 2,231,397, granted February 11, 1941. Any system for converting from one code to another should, for maximum efficiency, be capable of retaining during conversion, the protection gained by detecting and indicating faults existing in the received code signal combinations to be retransmitted.

Accordingly, it is an object of this invention to provide an improved means for converting from one code signal system to another.

It is a further object of the invention to detect multilations existing in the received signals and to automatically insert in the converted code transmission, signals for causing the receiving printer to record a specific symbol indicating the occurrence of errors in the received code.

More specifically it is an object of this invention to provide an improved telegraph code signal converter readily adaptable for converting a multiple element printer code to a multiple element printer code having a fewer number of elements.

Briefly, in accordance with the invention, received signals are fed to a tape transmitter and utilized to actuate a translator and an error detector. Normal signals are then fed through a translator to relays which establish converted signals. Upon the reception of an abnormal signal, paths are established through the translator to relays which establish a special converted code signal indicative of the fact that the signal was received in error. The converted signals are then conveyed to a distributor and retransmitted.

The above and other objects and advantages of the invention will become apparent upon a consideration of the following detailed description when taken in conjunction with the accompanying drawings representing schematically an embodiment of the invention and in which—

Figure 3:
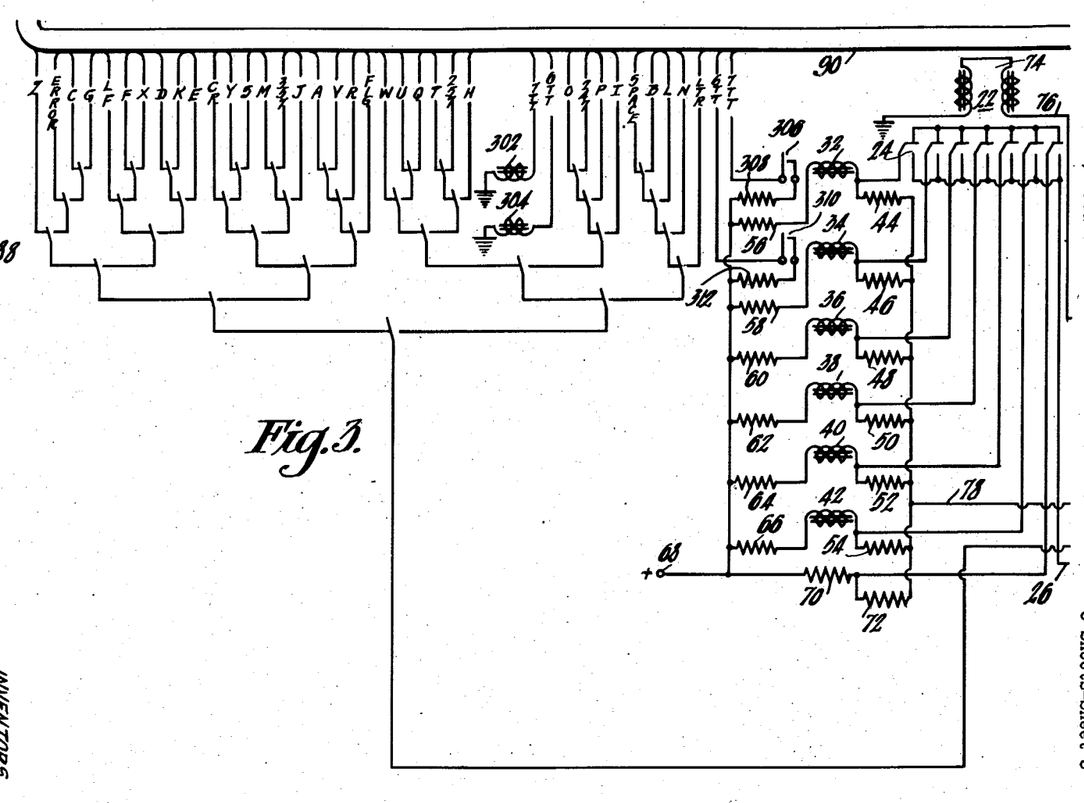
Fig. 3 represents schematically the circuits of the tape transmitter and the translator.
Figure 4:
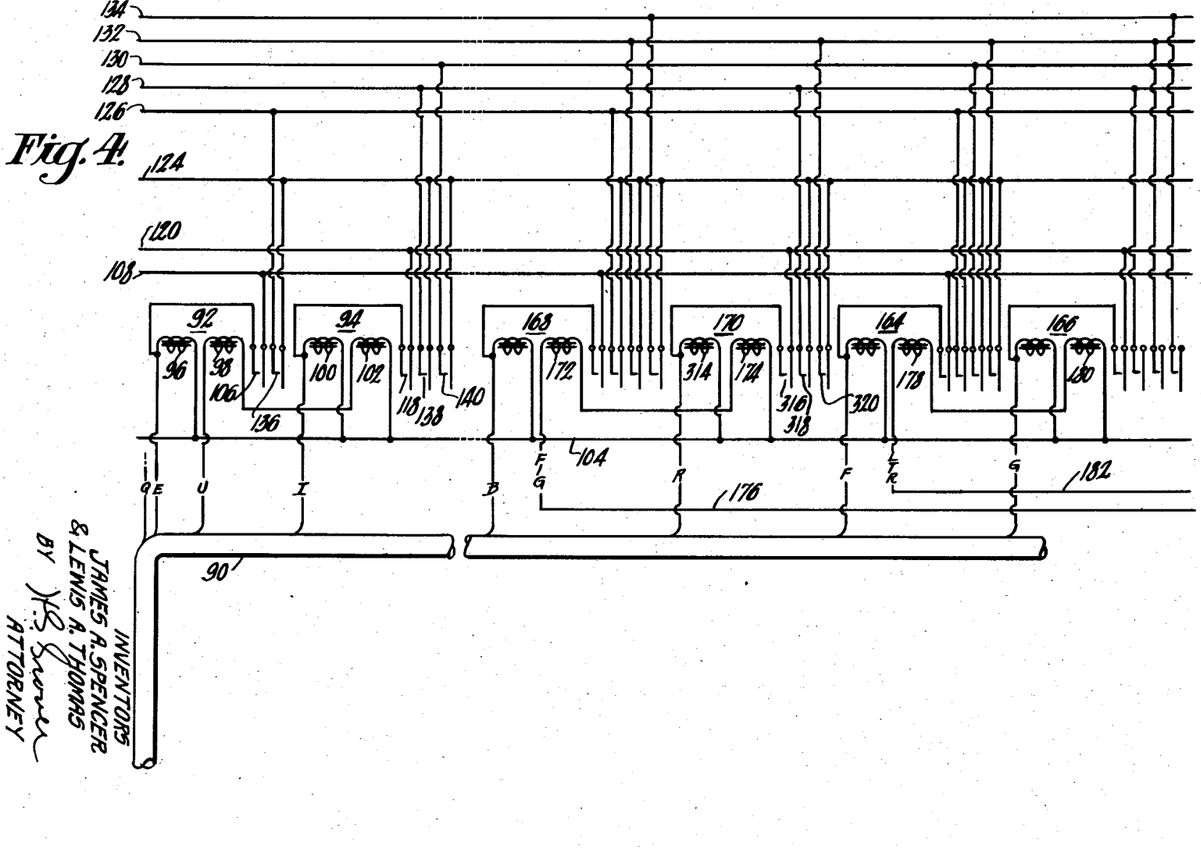
Fig. 4 represents schematically the circuits of the converter.
Figure 6:
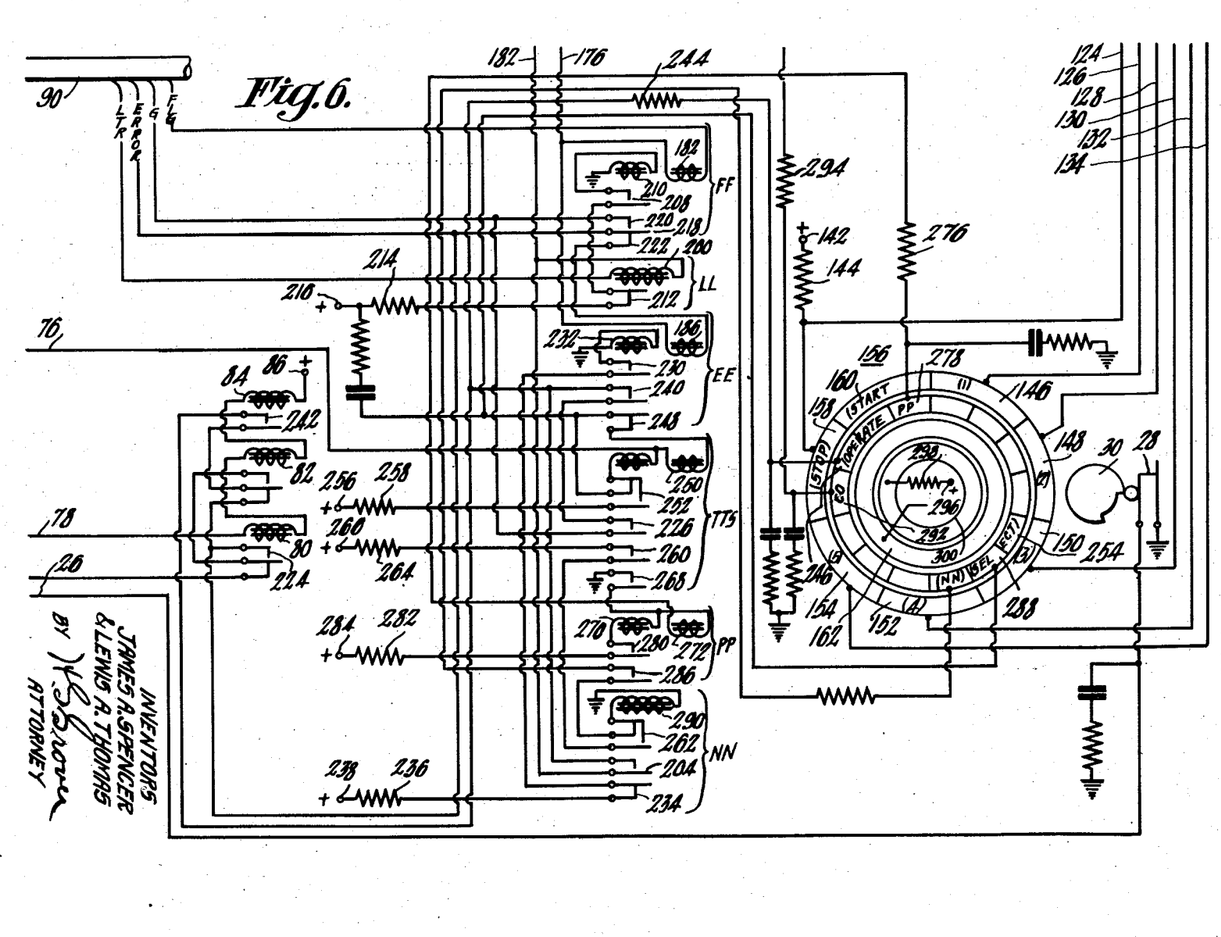
Fig. 6 represents schematically the circuits of the error detector and the distributor.

From a consideration of the drawings it will be apparent that Fig. 3 has been arranged to go to the left and as a continuation of Fig. 6; Fig. 4 arranged to go above Fig. 3 and as a continuation thereof; and Fig. 5 arranged to go to the right of Fig. 4 and as a continuation thereof as well as above and as a continuation of Fig. 6. Throughout the drawings like elements will be designated by like reference numerals.

For the purpose of simplifying the description of the operation of the invention, it will be assumed that it is desired to convert seven unit uniform length code signals having 3 mark and 4 space elements to five unit uniform length code signals having permutated mark elements. This assumption is to be made with the understanding that the invention is not limited thereto, since it will be apparent that the benefits of the invention may be achieved in systems used for conversion of other codes.

Figures 1, 5:
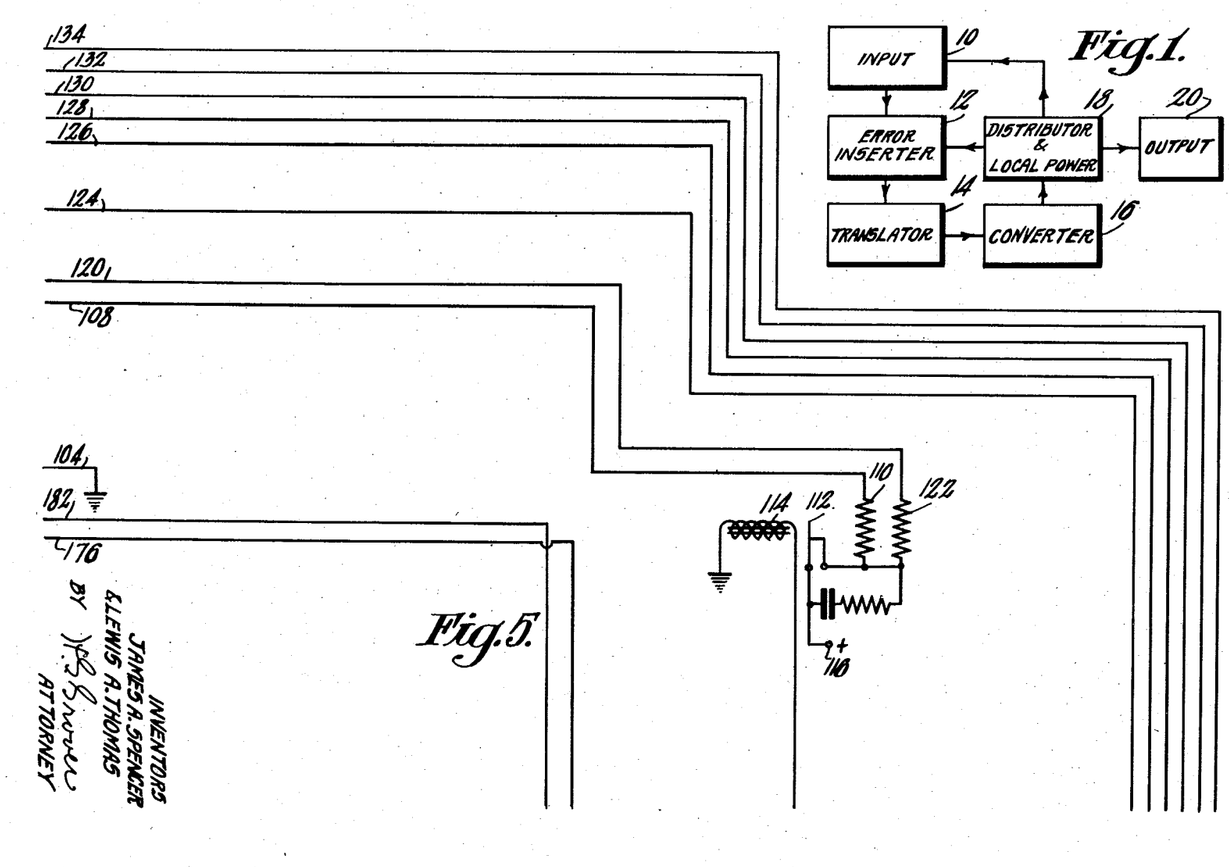
Fig. 1 represents, in block diagram, the basic elements of the embodiment of the invention chosen for purposes of illustration.
Fig. 5 represents schematically the connections between the converter and the distributor and the clearing relay circuit.

Referring to Fig. 1 it will be seen that there has been provided input means 10 including a source of signals to be converted. The signals are then conducted to an error inserter 12 and thence to a translator 14. From the translator 14 the signals are fed to a converter 16 and thence to a distributor 18. The distributor 18 functions to deliver the converted signals to the output means 20 and also to control certain functions of the error inserter 12 and the input means 10.

Figure 2:
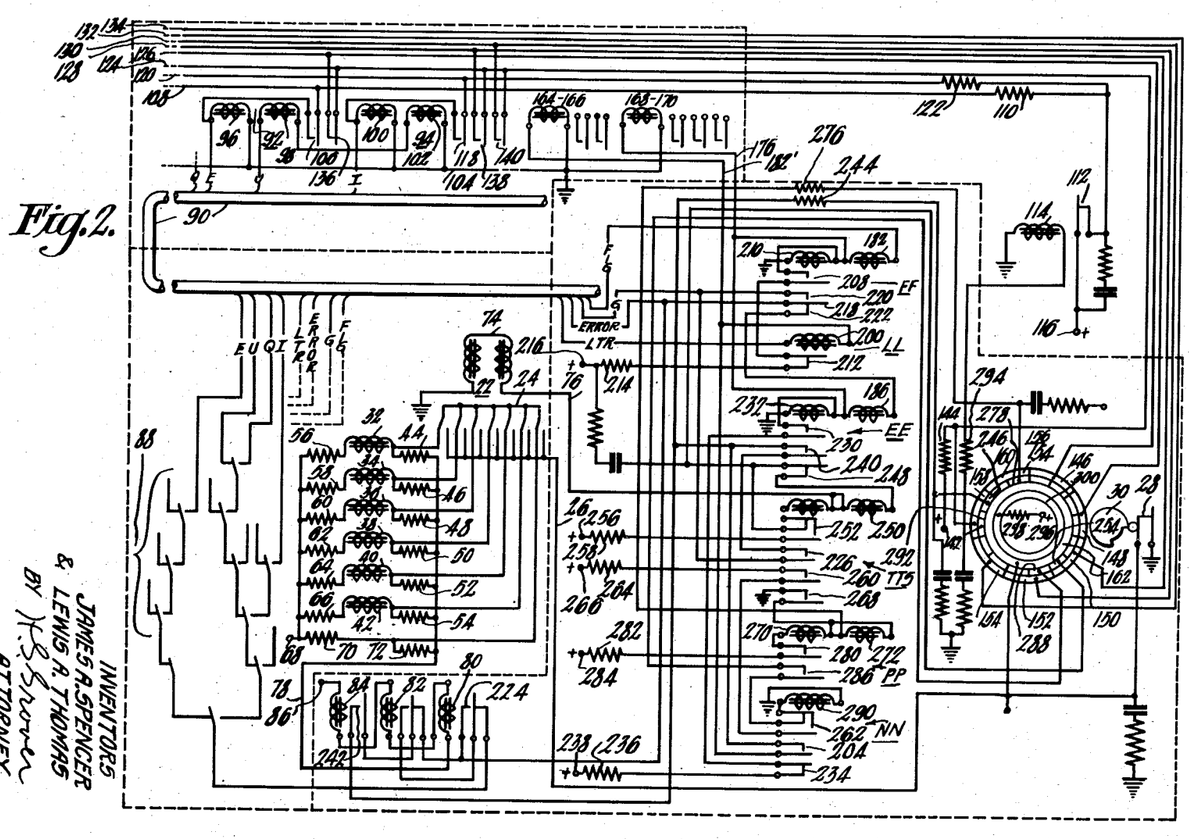
Fig. 2 represents schematically the circuits of the invention.

The general circuit connections of the invention will be described primarily with respect to Fig. 2. It will be seen that there has been provided a standard tape transmitter 22 having, in the assumed system, seven pairs of contacts 24. One side of each pair of contacts 24 is connected by line 26 through contacts 28 operated by cam 30 and thence to ground. The purpose and functioning of cam 30 will be described later. The other contact of each pair of contacts 24 is connected, with the exception of the contact corresponding to the last element of the input code signal, to the translator relays 32, 34, 36, 38, 40, and 42, respectively. At the point of connection of the translator relays and their corresponding contact among contacts 24 are connected parallel impedance devices 44, 46, 48, 50, 52, and 54, respectively. The other terminals of the translator relays are connected through line resistors 56, 58, 60, 62, 64, and 66, respectively, to a local source of supply 68. The excepted contact of contacts 24 is connected directly to line resistor 70 and to an impedance device 72 similar to those aforementioned. Line resistor 70 is connected to the local power supply 68. Impedance device 72 is connected in parallel with the aforementioned impedance devices. The tape advancing solenoid 74 of tape transmitter 22 has one terminal connected to ground and the other to line 76. The common line 78 of parallel impedance devices 44, 46, 48, 50, 52, 54, and 72 leads to the serially connected windings 80, 82 and 84, respectively, of the error-detecting relays and thence to a local source of operating voltage 86. The winding of error-detecting relay 80 is adjusted to operate on a current equal to that flowing through one of the parallel impedance devices such as 50; the winding of relay 82 is adjusted to operate on the current flowing through a predetermined number of such impedance devices, in the assumed case, three, and relay 84 is adjusted to operate on the current flow through more than the predetermined number of such impedance devices, in the assumed case, four or more.

The translator relays are equipped with pileups 88, only certain of which are shown, which establish separate output paths for each different incoming signal such as those indicated for the letter "E," "U," "Q," and "I." The output circuits are tied together to form the cable 90 and fed to the converter relays, only two of which, relay 92 and relay 94, are shown. It will be noted that relays 92 and 94 each carry a pair of operating windings, 96 and 98, and 100 and 102, respectively, and that certain of the output circuits from the translator pileups 88 pass through only one of such windings while others pass through the second windings of both coils. The windings of the remaining converter relays are similarly connected. Winding 96 of relay 92 has one terminal connected to the proper output lead from cable 90 and the other terminal connected to a common ground line 104. Winding 100 of relay 94 is similarly connected. Winding 98 of relay 92 and winding 102 of relay 94 are serially connected between the proper output lead from cable 90 and the grounded line 104.

Relay 92 is provided with contacts 106 which when closed complete a circuit from the grounded line 104 through winding 96 of relay 92, line 108, line resistor 110, contacts 112 of clearing relay 114 and thence to a local source of power 116. Relay 94 is equipped with a similar pair of contacts 118, which when closed complete a path from grounded line 104 through winding 100 of relay 94, line 120, resistor 122, contacts 112 of relay 114 and thence to the source of operating power 116. The circuits just described cause the respective relays to lock in closed position when actuated. Resistor 110 is chosen so as to supply the proper operating current for locking up one of the converter relays such as relay 92 and resistor 122 is chosen to supply the proper operating current to lock up one of the converter relays such as relay 94. These relays will require different currents due to the multiple windings and the possibility that a pair may be actuated together.

The converter relays are equipped with additional contacts which complete circuits between a common line 124 and one or more of lines 126, 128, 130, 132 or 134. For example, relay 92 carries contacts 136 which complete a circuit between common line 124 and line 126, while relay 94 carries contacts 138 and 140 which complete circuits between common line 124 and lines 128 and 130. The actuation of relays 92 and 94 will therefore close circuits between common line 124 and lines 126, 128 and 130. Similar contacts on the remaining converter relays will complete various combinations and permutations of connections between the common line 124 and the lines 126, 128, 130, 132 and 134.

A source of transmission power 142 is connected to common line 124 through line resistor 144, thence through the aforementioned permutation contacts to lines 126, 128, 130, 132 and 134 which in turn are connected to the commutator segments 146, 148, 150, 152 and 154, respectively, carried by the outer commutator ring of the distributor faceplate 156. It will be noted that the inner and outer commutator rings of the distributor faceplate 156 carry certain notations in parentheses. These notations have been added to simplify the understanding of the operation of the invention. The outer segmented ring corresponds with the standard commutator used for transmitting 5 unit signals. The notations (1), (2), (3), (4), and (5) indicate the elements of the signals while (Start) and (Stop) indicate the transmitted operating functions. The local operating functions are supplied to the apparatus through the inner commutator ring and are marked (Operate), (PP), (Select), (NN), and (CO) to correspond, as will appear, to the functions performed. Transmission power 142 is also connected to a commutator segment 158 on the outer commutator ring of the distributor faceplate 156. A further commutator segment 160 is provided in the outer commutator ring of the distributor faceplate 156 to which no connections are made. As is well known in the art suitable brushes are provided to sweep the aforementioned commutator segments and conduct any power appearing thereon to the transmission ring 162 and thence to the output circuits.

The circuit connections for causing the proper circuits to be set up indicating whether the next character to be transmitted is a letter or a figure may best be understood from a consideration of Fig. 4, where letter relays 164 and 166 and figure relays 168 and 170 are provided. One side of the serially connected windings 172 and 174 of relays 168 and 170, respectively, is connected to ground line 104, the other side connected to line 176. Similarly, the serially connected windings 178 and 180 of relays 164 and 166, respectively, have one side connected to the grounded line 104 and the other to line 182. Relays 164, 166, 168 and 170 are equipped with lock up contacts and permutation contacts similar to those provided for the other converter relays.

Returning to Fig. 2, it will be seen that line 176, from figure relays 168, 170, leads to one winding 182 of relay FF and to one winding 186 of relay EE. Similarly, line 182 leads to the winding 200 of relay LL and one of a pair of normally open contacts 204 actuated by relay NN.

Relay FF is equipped with normally open contacts 208 which when closed complete a circuit from ground to lock up winding 210 of relay FF, thence to normally closed contacts 212 of relay LL, line resistor 214 and a local source of power 216. Relay FF is also equipped with a tongue 218 coacting with the normally open upper contact 220 and a normally closed lower contact 222. To the tongue 218 is connected the normally open contact 224 of error relay 80 and, through cable 90, an output circuit from the pileups 88 of the translator. The normally open contact 220 is connected to a pair of normally open contacts 226 of relay TTS and, through cable 90, to the output circuit from the pileups 88 corresponding to the letter "G."

Relay EE is equipped with a pair of normally open contacts 230 which, when actuated, complete a circuit from ground through the lock-up winding 232 of relay EE, the normally closed contacts 234 of relay NN, line resistor 236 and a local source of power 238. Relay EE is also equipped with a pair of normally open contacts 240 which, when actuated, complete circuits between the upper of the normally open contacts 226 of relay TTS and the upper of normally open contacts 204 of relay NN, contacts 242 of error relay 84 and, through line resistor 244, commutator segment 246 of distributor faceplate 156. Relay EE is further equipped with normally closed contacts 248 which complete circuits from the open end of the differentially connected relay winding 250 of relay TTS, through the normally closed portion of make-before-break contacts 252, to the other end of differential winding 250 of relay TTS and also to commutator segment 254 of distributor faceplate 156. The center of differentially connected relay winding 250 is connected to tape transmitter 74 through line 76.

The normally open contact of make-before-break contacts 252 of relay TTS is connected to a local source of power 256 through resistor 258. Relay TTS is also equipped with a pair of normally open contacts 260 which, when actuated, complete a circuit from the normally open contact of the make-before-break contacts 262 of relay NN, through line resistor 264 to a local source of power 266. In addition, relay TTS is equipped with a pair of normally open contacts 268 which, when actuated, complete a circuit from ground to the inner and outer terminals, respectively, of one of a pair of windings 270 and 272 of relay PP. The inner terminal of winding 272 of relay PP is connected through line resistor 276 to commutator segment 278 of distributor faceplate 156. The outer terminal of winding 270 is connected to the normally open contacts 280 of relay PP which, when actuated, complete a path through line resistor 282 to a local source of power 284. Relay PP is also equipped with a pair of normally open contacts 286 which, when actuated, complete a circuit between the normally closed contact of make-before-break contacts 262 of relay NN and commutator segment 288 of distributor faceplate 156.

Relay NN is actuated by current flow through winding 290, one end of which is connected to ground and the other to the make-before-break contacts 262 of the relay NN.

Commutator segment 292 of distributor faceplate 156 is connected through line resistor 294 to the winding of clearing relay 114, the other end of which is connected to ground.

Commutator segments 246, 254, 278, 288 and 292 are sequentially supplied with positive power from local source 296 through line resistor 298 as they are swept by a suitable brush connecting them and slip ring 300.

Suitable resistor-condenser networks may be utilized throughout the circuit to minimize arcing at the relay contacts. Several of such networks has been illustrated. The operation of the invention will be described with reference to Figures 3, 4, 5 and 6.

Referring to Fig. 3, it will be assumed that the tape transmitter 22 has been set up to transmit a code signal consisting of 2 space elements, 2 mark elements, a space element, a mark element and a space element corresponding to the letter "R." The current will be fed from a local source of power 68 through translator relays 40, 38 and 34, respectively, causing corresponding translator pileups 88 to be actuated and set up an output path to lead to the cable 90 corresponding to the letter "R." Similarly, if any other code combination consisting of 3 mark elements and 4 space elements were set up by the tape transmitter 22 corresponding paths would be established by the translator relays and their corresponding pileups and one of the output paths to the cable 90 completed.

In order to insure the efficient operation of the translator pileups 88 it may be desirable to include on the relays having the greater number of contacts additional actuating windings. Such windings are represented in Fig. 3 by coils 302 and 304. It will be noted that these coils are effectively in parallel with the relay coils 32 and 34; coil 302 having one end connected to ground and the other fed through cable 90 to a pair of contacts 306 actuated by relay 32 and thence through line resistor 308 to a positive source of supply 68, and coil 304 having one side connected to ground and the other fed through cable 90 to contacts 310 actuated by relay 34 and thence to line resistor 312 and the local source of power 68. Although only two of such windings are shown, it will be obvious that any desired number may be used.

Referring to Fig. 4, it will be seen that the cable 90 supplies the outputs of the translator to a plurality of converter relays, six of which are shown. Continuing the example chosen of the letter "R" being translated, it will be seen that the corresponding lead from the cable 90 passes through one winding 314 of converter relay 170 and thence to grounded line 104. Upon the reception of an operating impulse converter relay 170 will be actuated and its contacts closed. The closure of contacts 316 will complete a path from the grounded line 104 through relay winding 314 to line 120 which, as will be seen from Fig. 5, will complete a path through line resistor 122, contacts 112 of relay 114 to a local source of power 116 causing relay 170 to be locked in closed position. Closure of contacts 318 and 320 of relay 170 will complete paths from common line 124 to lines 128 and 132, respectively.

Similarly, if a code combination corresponding to the letter "B" had been set up through the transmitter the corresponding lead from the cable 90 would have energized relay 168 which would have then been locked in closed position and its remaining contacts complete paths from common line 124 to lines 126, 132 and 134. Any other code combination which would set up paths through one winding of any of the converter relays would set up corresponding permutations of connections between the common line 124 and lines 126, 128, 130, 132 and 134.

It will be noted that the converter relays are arranged in pairs. By means of this arrangement it is possible to accomplish the conversion of signals with a fewer number of relays. For instance, converter relay 92 sets up a circuit between common line 124 and line 126 while converter relay 94 sets up circuits between common line 124 and lines 128 and 130. Assuming that the lead corresponding to the letter "U" has been set up through the translator coil 98 on relay 92 and the serially connected coil 102 on relay 94 will both be energized completing circuits between grounded line 124 and lines 126, 128 and 130. Accordingly, these two relays can set up three different code combinations. The remaining converter relays are similarly connected in pairs.

Referring now to Figs. 5 and 6, it will be seen that common line 126 leads to a local source of power 142 through resistor 144 and that the lines 126, 128, 130, 132 and 134 lead to commutator segments 146, 148, 150, 152 and 154 of the distributor faceplate 156. Accordingly, when converter relay 170 is actuated power from the local source 142 will be fed to commutator segments 148 and 152 and when the outer distributor ring is swept by the brushes there will be fed to the output impulses corresponding to the five unit code for the letter "R." The operation of the other converter relays will set up similar paths to the outer distributor ring of the distributor faceplate 156 and corresponding signals fed through the brushes to the output.

The operation of the error insertion will be described with particular reference to Figs. 3 and 6. The transmission from the tape transmitter 22 of a signal containing less than 3 mark elements will, through the action of currents flowing through only one or two of the corresponding parallel impedance devices 44, 46, 48, 50, 52, 54 and 72, actuate error relay 84. Error relays 82 being adjusted to operate only on currents flowing through three or more of the parallel impedance devices will not be actuated. Accordingly, a path will be set up from the operate segment 246 of the distributor faceplate 156 through contacts 242 of error relay 84, thence through the lower contact of error relay 82 to the tongue 218 of relay FF. Similarly, if a signal containing more than 3 mark elements is fed from the tape transmitter 22, error relays 80, 82 and 84 will be actuated and a path set up from the operate segment 246 of distributor faceplate 156 through contacts 242 of relay 86, the upper contacts of relay 82, the upper contacts of relay 80 and thence to the tongue 218 of relay FF. It will thus be seen that a path can be established to the pileups 88 of the translator only upon the reception of a signal containing a normal number of mark elements which will actuate only the error relays 82 and 84, thereby establishing a path from the operate segment 246 of the distributor faceplate 156 through contacts 242 of error relay 86, the upper contacts of error relay 82 and the lower contacts of relay 80 to the translator pileups. This action makes it possible to utilize paths through the pileups which are not under the control of each translator relay and also make possible the elimination of one of the translator relays.

In converting from a seven unit code to a five unit code there are certain combinations of the mark and space elements of the seven unit code containing the predetermined number of mark elements which are not representative of intelligence. Such a combination is represented by a signal in which the third, fifth and seventh elements are mark elements and the remaining elements spaces. It will be seen that because of the fact that the normal number of mark elements are present a path would be established through the error detector relays 80, 82 and 84 to the pileups 88 of the translator.

In order that these combinations may be recognized as transmitted in error, these combinations are fed through the cable 90 directly to the tongue 218 of relay FF. Similarly, where a code combination is used in the seven unit code indicative of an error, the corresponding output circuit through the pileups 88 of the translator are fed through cable 90 directly to the tongue 218 of relay FF.

The method of inserting an error indication in the converter circuit will be described in connection with Figs. 3, 4 and 6. The "Figure" circuit connects to the converter relay 168 through one winding 182 of relay FF so that whenever a figure selection occurs relay FF is actuated and is locked up through a circuit from ground through winding 210, its own contacts 208, the normally closed contacts 212 of relay LL, line resistor 214 to a source of local power 216. The "Letter" circuit is connected to converter relay 164 through the winding 200 to relay LL. Therefore, whenever a letter selection occurs relay LL will operate and the opening of contacts 212 will release relay FF. The function of relays FF and LL is, therefore, to register the last case shift selection passed through the system.

Upon reception of an error the error relays will connect the operate impulse from the distributor faceplate 156 to the tongue 218 of relay FF, as described above. Thus, should the last case shift selection preceding an error be "Figures" the operate impulse may be traced through the tongue 218 of relay FF to contact 220 of relay FF and thence through cable 90 to the "G" winding 322 of converter relay 166. This arrangement automatically converts the error selection to an upper case "G" indicative of an error.

If the last case shift transmission preceding an error be "Letter," the operate impulse is routed through tongue 218 of relay FF, contact 222 of relay FF and winding 186 of relay EE to the windings 172 and 174 of converter relays 168 and 170, respectively, causing a figure code combination to be transmitted over the signalling circuit. From this point on the sequence of operation is as follows: Relay EE is actuated and locked up through a circuit from ground through winding 232, contacts 230 of relay EE, contacts 234 of relay NN, line resistor 236 and a local source of power 238. The windings of relay TTS being differentially connected are effectively in series with a circuit beginning with the impulse received from commutator segment 254 of distributor faceplate 156 and extending through the windings of the tape advancing solenoid 74 of the tape transmitter 22 to ground. The normal function of this circuit is to electromechanically operate tape transmitter 22 and advance the perforator tape. However, when one winding of relay TTS is opened by the operation of relay EE in response to an error signal the next succeeding select impulse from commutator segment 254 of distributor faceplate 156 causes relay TTS to operate and lock up through a circuit completed through its make-before-break contacts 252 from a source of power 256, through line resistor 258, contacts 252, one portion of the winding 250 of relay TTS, tape operating solenoid 74 of tape transmitter 22 to ground. The operation of relay TTS establishes a circuit from the operate impulse through a pair of contacts 240 of relay EE, contacts 226 of relay TTS to the "G" lead in cable 90. The lead from cable 90 is fed through coil 322 of converter relay 166 establishing a "G" combination.

Contacts 268 on relay TTS complete a circuit from commutator segment 278 of distributor faceplate 156 through resistor 276, winding 272 of relay 274 and thence to ground. Relay PP will be locked into position by means of a current flow through a circuit from a local source of power 284, line resistor 282, contacts 280 of relay PP, winding 270 of relay PP, contacts 268 of relay TTS to ground.

Relay PP will operate on the impulse from commutator segment 278 during the "G" transmission and completes the operating circuit from commutator segment 288, contacts 286 of relay PP through the closed portion of make-before-break contacts 262 of relay NN, the winding of relay NN to ground. Relay NN will be locked into position by means of a circuit completed from ground through the winding of relay NN, the normally open contact of the make-before-break contacts 262 of relay NN, contacts 260 of relay TTS, line resistor 264 and the local source of power 266. Contacts 204 on relay NN connect the operate impulse to line 182 which feeds the operating impulse to the windings 178 and 180 of converter relays 164 and 166, respectively, establishing a "Letter" combination. The operation of relay NN opens contacts 236 of relay NN which releases the locking circuit of relay EE and prepares relay TTS to release in response to the next select impulse from commutator segment 254 of distributor faceplate 156 which occurs during the letters transmission. This release occurs since the opening of contacts 248 of relay EE again connects the windings of relay TTS differentially.

When the brush between the ring 390 and the inner commutator of distributor faceplate 156 connects the local source of power 296 to commutator segment 292 of distributor 156 a circuit is completed through line resistor 294 to the winding of clearing relay 114 and thence to ground. The actuation of clearing relay 114 opens contacts 112 restoring the converter relays to their normal unoperated position.

Cam 30 is positioned on the brush shaft and is phased so as to open the circuit for operating the tape transmitter 22 during the time when selections are being established.

Having thus described our invention, what we claim is:

1. In a telegraph system utilizing uniform length code signals having a fixed number of mark and space elements, a plurality of parallel impedance devices each respectively actuated by said mark elements, a plurality of error-detecting relays actuated under control of currents flowing through said impedance circuits, translating means responsive to the mark elements of said code signals and having a shift device adapted to actuate a plurality of shift conditions in the translating means each in response to a corresponding plurality of code signals, each said condition being maintained until a subsequent shift signal is received, means actuated by said translating means for converting said signals into code signals having a different number of mark and space elements, and means actuated by said error-detecting relays for causing said converter means to set up a predetermined code group indicative of an error whenever said signals contain an abnormal number of marking elements and actuating said shift device to select one of said shift conditions during an error indication and to return said shift condition to its preceding condition.

2. In a telegraph system utilizing uniform length code signals having a fixed number of mark and space elements, a plurality of parallel impedance devices each respectively actuated by said mark elements, a plurality of error-detecting relays actuated under control of currents flowing through said impedance circuits, translating means comprising a plurality of switching circuits actuated by said mark elements and a shift circuit to select one of a plurality of selected shift conditions in response to a selected code signal corresponding thereto and to maintain said shift condition until a succeeding one of said selected signals is received, means actuated by said translating means for converting said signals into code signals having a different number of mark and space elements, and means actuated by said error-detecting relays for causing said converter means to set up a predetermined code group indicative of an error whenever said signals contain an abnormal number of marking elements and for causing the selection of a predetermined shift condition.

3. In a telegraph system utilizing uniform length code signals having a fixed number of mark and space elements, a plurality of parallel impedance devices each respectively actuated by said mark elements, a plurality of error-detecting relays actuated under control of currents flowing through said impedance circuits, translating means responsive to the mark elements of said code signals and a shift circuit to select a selected one of two shift conditions in response to a selected code signal corresponding thereto and to maintain said shift condition until a succeeding one of said selective signals is received, a plurality of switching means actuated by certain circuits within said translating means arranged to convert said signals into code signals having a different number of mark and space elements, and means actuated by said error-detecting relays for causing said converter means to set up a predetermined code group indicative of an error whenever said signals contain an abnormal number of marking elements and for causing the selection of a predetermined shift condition.

4. In a telegraph system utilizing uniform length code signals having a fixed number of mark and space elements, a plurality of parallel impedance devices each respectively actuated by said mark elements, a plurality of error-detecting relays actuated under control of currents flowing through said impedance circuits, translating means comprising a plurality of switching circuits actuated by said mark elements and a shift circuit to select one of a plurality of selected shift conditions in response to a selected code signal corresponding thereto and to maintain said shift condition until a succeeding one of said selected signals is received, a plurality of switching means actuated by said translating means arranged to convert said signals into code signals having a different number of mark and space elements, means for causing certain of said translator switching circuits to actuate a plurality of said converter switching means, means actuated by said error-detecting relays for causing said converter means to set up a predetermined code group indicative of an error whenever said signals contain an abnormal number of marking elements, means for causing said converting means to set up said error indicative code group when said signals contain a normal number of mark elements in predetermined space relationship, and means for causing the selection of a predetermined shift condition during an error indication and the return to the last preceding shift condition thereafter.

5. In apparatus for changing seven element into five element code signals, a plurality of parallel impedance devices each respectively under the control of one of the elements of said seven unit code, a plurality of error detecting relays actuated under the control of currents flowing through said impedance circuits, a plurality of translator relays, one for each element of said seven unit code, provided with multiple resting and operating contacts arranged to complete one only of a number of output paths, a second set of relays arranged to be actuated through said output paths provided with multiple contacts arranged to complete paths corresponding to said five element code, means actuated by said error detecting relays for causing said second set of relays to set up a five element code group indicative of an error whenever said seven unit signals contain an abnormal number of marking elements, means to actuate a shift mechanism in a chosen one of a plurality of conditions in response to a corresponding set of code signals and to maintain said shift condition until another different one of said plurality of corresponding code signals is received, and means to maintain a predetermined shift condition in response to each said error signal and to return to the preceding shift condition before reception of the next signal shift.

6. In a telegraph system utilizing uniform length code signals having seven mark and space elements, a plurality of parallel impedance devices each respectively actuated by said mark elements, a plurality of error-detecting relays actuated under control of currents flowing through said impedance circuits, translating means responsive to the mark elements of said code signals and having two shift conditions each assumed in response to a predetermined code signal, each said condition being maintained until the reception of the other code signal operative to return said translating means to the other said shift condition, means actuated by said translating means for converting said signals into code signals having five mark and space elements, and means actuated by said error-detecting relays for causing said converter means to set up a predetermined code group indicative of an error whenever said signals contain an abnormal number of marking elements and to cause the selection of one of said shift conditions during an error indication and on reception of the next non-erroneous signal thereafter to return to the preexisting shift condition.

JAMES A. SPENCER.
LEWIS A. THOMAS.

REFERENCES CITED

The following references are of record in the file of this patent:

UNITED STATES PATENTS

| Number | Name | Date |
|---|---|---|
| 2,152,772 | Potts | Apr. 4, 1939 |
| 2,153,737 | Spencer | Apr. 11, 1939 |
| 2,309,222 | Spencer | Jan. 26, 1943 |
| 2,370,989 | Nicols | Mar. 6, 1945 |